Patented Dec. 12, 1922.

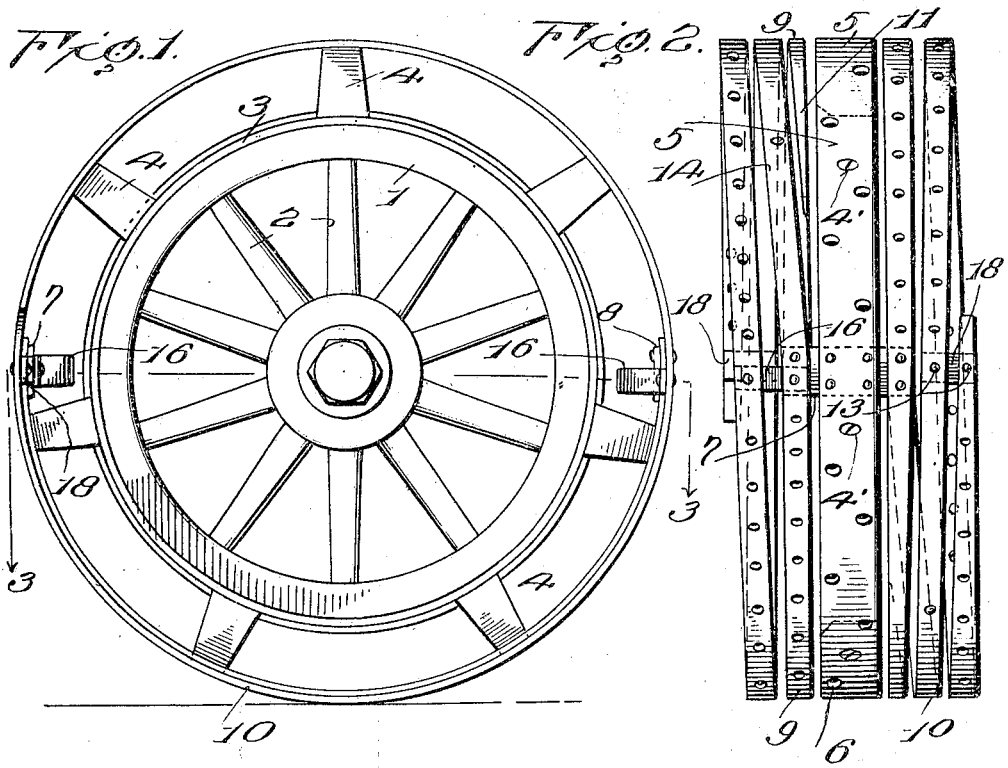

1,438,339

UNITED STATES PATENT OFFICE.

JOHN M. SHANNON, OF BANGOR, AND CLARENCE D. SHANNON, OF GREENBUSH, MAINE.

SNOW TIRE.

Application filed October 17, 1921. Serial No. 508,144.

*To all whom it may concern:*

Be it known that we, JOHN M. SHANNON and CLARENCE D. SHANNON, citizens of the United States, residing, respectively, at Bangor and Greenbush, in the county of Penobscot, State of Maine, have invented certain new and useful Improvements in Snow Tires, of which the following is a description, reference being had to the accompanying drawing and to the figures of reference marked thereon.

This invention relates to tires, and more particularly to a snow tire adapted to be attached to the rim of an automobile or the like.

One of the objects of this invention is to provide an attachment of the above character which will permit the automobile or other vehicle to propel itself through snow or along roads covered with ice.

Another object of this invention is to provide a snow tire of the above type which is provided with cushioning means to prevent the tire from receiving the shocks due to rough places or other obstructions in the road or in the snow.

An additional feature of this invention is to provide a snow tire with a broad snow treading surface, a portion of which is formed as a helix adapted to act like a screw and bite into the snow as it passes therethrough to give the tire a better tractive effect.

Yet another object of this invention is to provide a snow tire with means whereby it can be provided with attachments adapted to grip into icy roads.

These and other objects will in part be obvious and will in part be hereinafter more fully disclosed.

Referring to the drawings—

Figure 1 is a side view of our improved snow tire;

Fig. 2 is a front perspective view of the same,

Fig. 3 is a section on the line 3—3 of Fig. 1, and

Fig. 4 is a detail showing the manner of attaching the ice gripping calks.

In general, the invention comprises a snow treading surface in the form of a relatively broad flat metallic hoop adapted to be attached to the rim or other suitable portion of the wheel and two flat metallic helices resiliently mounted on each side of the central hoop and of a circumference equal to the circumference of the hoop. These helices not only form continuations of the central broad snow tread, but also provide by their screw action, the means for gripping the snow. Preferably the rims, both central and helical are perforated to receive steel ice gripping lugs or calks. The action of this broad snow treading surface formed with perforations and with the oppositely arranged helices is similar to that of the well-known snow shoe in which the broad surface provided with perforations enables the wearer to stand up on the snow, the perforations in the snow shoe constituting the snow gripping means.

Referring particularly to the accompanying drawings, the invention is illustrated as applied to the felly 1 of an automobile wheel 2 after the rubber tire has been removed. The snow tire comprises an inner rim 3 which is directly attached to the rim 1. This outer rim 3 is provided at equi-distant points with wooden or metal spokes or spacing blocks 4 to which are fastened a relatively broad steel hoop 5, as by means of the screws 4'. While this hoop is shown as circular, it is within the contemplation of this invention to have it substantially circular, such as by being formed in non-continuous segments. This central hoop 5 is preferably provided with a series of perforations 6 hereinafter referred to. This hoop 5 constitutes a relatively broad snow treading surface.

At diametrically opposite sides of the hoop 5, the clamps or braces 7 and 8 are bolted inside of the steel hoop 5 so as to project out at each side for the helical coils to be attached to. Their function is to furnish the support for these coils on either side of the steel band. These bracket members extend transversely of the circumference of the hoop and are adapted to form the means for attaching the oppositely arranged helical treads 9 and 10 which are similar in construction. The helical tread 9 is formed for a part of the coil of the helix of double thickness in order to strengthen and support it. For instance, the helix 9 is attached near its inner end 11 as by means of a rivet or other suitable fastening means 12 to the transverse brace 8. It then extends around the tire in the circumferential plane of the central hoop 5 to the opposite brace 7 where it is riveted thereto as at 13. This part of the helical coil 9 is preferably perforated. From the brace 7, the helical coil 9 continues around in circumferential plane of the hoop 5 as a double imperforate thickness to a point in the transverse plane of the brace 8 where the double thickness 14 stops and the coil 9 continues as a single perforated thickness to a point in the plane of the transverse brace 7 where it is braced as at 15 by means of the resilient brace 16 to the double portion 14 of the coil. The tip 17 of the coil is preferably braced in spaced relation to the preceding portion of the coil by means of the transverse brace 18. By means of the various braces, this helix 9 is held in a coiled spaced relation at the side of the central hoop so as to constitute a snow treading surface continuing with the surface of this central hoop.

Arranged on the other side of the central hoop 5 is the oppositely arranged helical snow treading surface or coil 10 which is exactly similar in construction to the coil 9 previously described, and is attached to the hoop 5 and held in spaced relation thereto in exactly the same manner. These helical coils are wound in opposite directions and turn toward the central steel hoop 5 as the wheel is in motion which causes the coils to bite into the snow and produce a very good tractive effect.

For use in icy weather, there is provided a number of metallic calks or ice gripping lugs 19, which as shown in Fig. 4, are adapted to be inserted in the perforations of the central hoop 5 and the helical coils 9 and 10. These calks 19 are held on by nuts 20 or by any other suitable fastening means.

It will thus be seen that an attachment of the above character is easily applied to the rim of an automobile and when so applied, will permit the automobile to traverse across snow for the reason that the hoop 5 and the steel coils 9 and 10 provide a broad treading surface which prevents the wheel from plowing deeply into the snow. At the same time, the screw arrangement of the coils 9 and 10 grip the snow as before described. In addition to this gripping effect, these coils 9 and 10 are so constructed and so mounted on the main hoop 5 as to provide a cushioning means to prevent shocks being transmitted through the snow tire to the automobile.

It is obvious that minor changes in the details of construction and the arrangement of the parts may be made without departing from the spirit of the invention as set forth in the appended claims.

Having thus described the invention, what we claim as new and desire to secure by Letters-Patent, is—

1. A snow tire adapted to be attached to a vehicle wheel comprising relatively broad snow treading means, and an additional snow treading surface carried by and forming an extension of said first-mentioned treading means, said additional surface being constructed and arranged to grip the snow on rotation of said wheel.

2. A snow tire adapted to be attached to a vehicle wheel comprising relatively broad snow treading means, and additional snow gripping means arranged at the side of said treading means so as to form an extension thereof, said gripping means being constructed and arranged to form a cushioning means for said wheel.

3. A snow tire comprising a relatively broad hoop, means for attaching the same to a vehicle wheel so as to constitute a snow treading surface, and resilient treads arranged on each side of said broad hoop and constituting cushioning means for said wheel.

4. A snow tire comprising a relatively broad hoop, means for attaching the same to a vehicle wheel so as to constitute a snow treading surface, and resilient means arranged laterally of said treading means forming additional snow treading surfaces for said wheel, said additional means being constructed and arranged to cushion the wheel from shocks.

5. A snow tire adapted to be attached to a vehicle wheel comprising a substantially broad snow tread adapted to roll on the snow consisting of a central broad hoop and oppositely arranged resiliently mounted helical coils forming screw-like snow gripping surfaces of a diameter equal to the diameter of the central hoop.

6. A snow tire adapted to be attached to a vehicle wheel comprising a plurality of steel hoops providing a substantially broad snow tread adapted to roll on the snow, said hoops being perforted, and a detachable ice spike arranged in each of said perforations.

In testimony whereof, we affix our signatures.

JOHN M. SHANNON.
CLARENCE D. SHANNON.